United States Patent [19]

Inoue et al.

[11] 4,368,180

[45] * Jan. 11, 1983

[54] METHOD FOR PRODUCING POWDER OF α-SILICON NITRIDE

[75] Inventors: Hiroshi Inoue, Saitama; Katsutoshi Komeya, Kanagawa; Akihiko Tsuge, Yokohama all of Japan

[73] Assignee: Tokyo Shibaura Denki Kabushiki Kaisha, Kawasaki, Japan

[*] Notice: The portion of the term of this patent subsequent to Apr. 28, 1998, has been disclaimed.

[21] Appl. No.: 293,305

[22] Filed: Aug. 17, 1981

Related U.S. Application Data

[60] Continuation-in-part of Ser. No. 250,175, Apr. 2, 1981, abandoned, Division of Ser. No. 121,095, Feb. 13, 1980, Pat. No. 4,264,565.

[30] Foreign Application Priority Data

Feb. 19, 1979 [JP]  Japan ................................. 54-17188

[51] Int. Cl.³ ............................................. C01B 21/068
[52] U.S. Cl. .................................. 423/344; 423/406; 501/97
[58] Field of Search .................. 423/344, 406; 501/97

[56] References Cited

U.S. PATENT DOCUMENTS 3,855,385  12/1974  Cutler ................................. 423/344
4,117,095   9/1978  Komeya et al. ..................... 423/344
4,264,565   4/1981  Inove et al. ........................ 423/344

FOREIGN PATENT DOCUMENTS 52-38500   3/1977  Japan .
53-102300  9/1978  Japan .

*Primary Examiner*—Jack Cooper
*Attorney, Agent, or Firm*—Oblon, Fisher, Spivak, McClelland & Maier

[57] ABSTRACT

A method for producing powder of a α-silicon nitride which comprises the steps of adding 0.1 to 2 parts by weight of carbon and 0.005 to 1 part by weight of at least one silicon compound selected from the group consisting of $Si_3N_4$, SiC and $Si_2ON_2$ to one part by weight, when converted to $SiO_2$, of a liquid alkylchlorosilane that forms a precipitate and HCl by hydrolysis which precipitate is convertible to $SiO_2$ at a baking temperature of 1300° to 1550° C., hydrolyzing the resultant mixture, washing the mixture to separate a solid component, and baking the solid component at a temperature of 1300° to 1550° C. in an atmosphere mainly consisting of a nitrogen gas or a gas of a nitrogen compound to effect formation of α-silicon nitride.

14 Claims, No Drawings

METHOD FOR PRODUCING POWDER OF α-SILICON NITRIDE

CROSS-REFERENCE TO THE RELATED APPLICATION

This application is a continuation-in-part application of the U.S. patent application Ser. No. 250,175 filed Apr. 2, 1981 now abandoned which in turn is a divisional application of U.S. patent application Ser. No. 121,095 filed Feb. 13, 1980, now U.S. Pat. No. 4,264,565.

BACKGROUND OF THE INVENTION

This invention relates to a method for producing powder of α-silicon nitride and more particularly to a method of producing powder of α-silicon nitride of high quality in high yield.

A sintered product of powder mixture containing powder of silicon nitride as a main raw material such as silicon nitride-yttrium oxide ($Si_3N_4$—$Y_2O_3$) or silicon nitride-magnesium oxide ($Si_3N_4$—MgO) has high mechanical strength and heat resistance. Therefore, an attempt is made to apply such sintered product as a material of a structural member of, for example, a high temperature gas turbine. A sintered product practically used as a material of a structural member withstanding high temperature and great stress is rigidly demanded to have prominent physical and chemical stability at high temperature. The particularly important thermal and mechanical properties of the sintered product are largely affected by the kinds of the powders and the content of impurities therein. The powder of silicon nitride is preferred to contain as much α-$Si_3N_4$ as possible. The following three proceses are generally known for the production of powder of $Si_3N_4$:

(1) Nitrogenizing powder of metallic silicon;

$$3Si + 2N_2 \rightarrow Si_3N_4$$
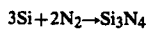

(2) Carrying out a gaseous reaction between silicon tetrachloride or silane and ammonia;

$$3SiCl_4 + 4NH_3 \rightarrow Si_3N_4 + 12HCl$$
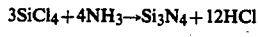

(3) Reducing silica powder with carbon in a nitrogen atmosphere $$3SiO_2 + 6C + 2N_2 \rightarrow Si_3N_4 + 6CO$$
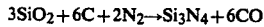

With the above-mentioned process of (1) in which an exothermal reaction takes place, it is necessary to control the exothermal reaction, for example, by finely crushing relatively coarse powder of silicon after nitrogenization. During the step of such fine crushing, impurities are unavoidably carried into powder $Si_3N_4$ produced. Therefore, the product has many problems for application as a material of, for example, a structural member for a high temperature gas turbine, though usable as a heat-resisting and corrosion-resisting material of low quality.

The process of (2) is suitable for production of a material used as a coating on the surface of, for example, a semiconductor element, but meets with a difficulty for the mass production of an inorganic heat-resistant material.

The process of (3) has the drawbacks that it is necessary to use fully purified powders of $SiO_2$ and carbon as raw materials, and that since the resultant product is a mixture, of for example, α-$Si_3N_4$, β-$Si_3N_4$, silicon oxynitride ($Si_2ON_2$) and SiC, it is difficult to control a yield of α-$Si_3N_4$. Therefore, the process of (3) has practically problems in raw material and reaction conditions, though having the advantage of causing reaction to proceed by an uncomplicated process.

SUMMARY OF THE INVENTION

It is accordingly the object of this invention to provide a method for producing powder of α-silicon nitride suitable for use as a material of a structural member resistant to high temperature and great stress, in high yield, without the necessity of applying a complicated process and reaction apparatus.

According to this invention, there is provided a method for producing powder of α-silicon nitride, comprising the steps of:

adding 0.1 to 2 parts by weight of carbon and 0.005 to 1 part by weight of at least one silicon compound selected from the group consisting of $Si_3N_4$, SiC and $Si_2ON_2$ to one part by weight, when converted to $SiO_2$, of a liquid alkylchlorosilane that forms a precipitate and HCl by hydrolysis which precipitate is convertible to $SiO_2$ at a baking temperature of 1300° to 1550° C.;

hydrolyzing the resultant mixture;

washing the mixture to separate a solid component; and baking the solid component at a temperature of 1300° to 1550° C. in an atmosphere mainly consisting of a nitrogen gas or a gas of a nitrogen compound to effect formation of α-silicon nitride.

According to this invention, there is also provided a method for producing powder of α-silicon nitride comprising the steps of:

hydrolyzing a liquid alkylchlorosilane to form a precipitate and HCl, the precipitate being convertible to $SiO_2$ at a baking temperature of 1300° to 1550° C.;

washing the hydrolyzed mass to separate a solid component;

adding 0.1 to 2 parts by weight of carbon and 0.005 to 1 part by weight of at least one silicon compound selected from the group consisting of $Si_3N_4$, SiC and $Si_2ON_2$ to one part by weight, when converted to $SiO_2$, of said precipitate; and baking the resultant mixture at a temperature of 1300° to 1550° C. in an atmosphere mainly consisting of a nitrogen gas or a gas of a nitrogen compound to effect formation of α-silicon nitride.

DETAILED DESCRIPTION OF THE PREFERRED EMBODIMENTS

This invention relates to a method for manufacturing powder of α-silicon nitride by using liquid alkylchlorosilane as a raw material. In one aspect of this invention the method includes a process for adding carbon and silicon compound to liquid alkylchlorosilane to hydrolize the mixture. In another aspect of this invention the method includes a process for adding carbon and silicon compound to a solid component obtained by hydrolizing alkylchlorosilane. The former process is hereinafter called "a wet process" and the latter process "a dry process."

The method of this invention will be explained in more detail, focusing attention on the wet process.

Liquid silane derivatives used in the method of this invention which produce a precipitate and HCl by hydrolysis and cause $SiO_2$ to be produced by the baking of said precipitate include alkylchlorosilane, and preferably methyltrichlorosilane which allows for ready hydrolysis. In this case, it is possible to replace 1 part of methyltrichlorosilane by, for example, 20% by weight or less of dimethyldichlorosilane.

The methyltrichlorosilane in a mixture of powders of carbon and a silicon compound is hydrolyzed by the following reaction formula:

$$CH_3SiCl_3 + H_2O \rightarrow CH_3SiO_{3/2} + HCl$$

Namely, HCl is produced together with a precipitate of $CH_3SiO_{3/2}$. The resultant mixture of these products, powders of carbon and silicon compound is thereafter washed and filtered. The HCl thus produced very effectively eliminates impurities such as Ca and Fe in the powders of carbon and silicon compound powders, thereby ensuring the production of $\alpha$-$Si_3N_4$ of high purity. The $CH_3SiO_{3/2}$ is baked into $SiO_2$, and reduced and nitrogenized into $Si_3N_4$.

In the silicon industry, methyltrichlorosilane is obtained as a by-product with high purity in large quantity. Therefore, application of methyltrichlorosilane makes it possible to produce $\alpha$-$Si_3N_4$ at low cost.

The liquid silane compound, powder of carbon and powder of a silicon compound acting as a nucleating agent which are all used as the starting material in the method of this invention are chosen to have the weight ratio (as measured on the basis of the weight of $SiO_2$) of 1 (as converted to $SiO_2$): 0.1 to 2: 0.005 to 1 or preferably 1: 0.4 to 1: 0.01 to 0.1. The reason for this is as follows. Less than 0.1 part by weight of the carbon powder based on 1 part by weight of $SiO_2$ causes part of the $SiO_2$ to remain unreacted and results in the noticeable growth of $Si_2ON_2$ and a decrease in production of desired $\alpha$-$Si_3N_4$. Where the carbon powder is added in a larger amount than 2 parts by weight, then $\beta$-$Si_3N_4$ is formed, deteriorating the purity of the $\alpha$-$Si_3N_4$ and reducing its yield.

Less than 0.005 part by weight (based on 1 part by weight of $SiO_2$) of powder of a silicon compound results in a decline in the function of acting as a nucleating agent which enables powder of $\alpha$-$Si_3N_4$ to be produced with the uniform particle size in high yield. Conversely where the powder of a silicon compound is applied in a larger proportion than 1 part by weight, then said nucleating agent powder displays its property too prominently to produce $\alpha$-$Si_3N_4$ having preferred powder characteristics.

For the object of this invention, it is preferred to use the liquid silane compound, powder of carbon and powder of the nucleating agent all having a lower impurity metal than 0.1% by weight. The powder of carbon is preferred to have a particle size of 1 micron or less.

The powder of the nucleating agent is desired to have a particle size of 2 microns or less. Powder of $Si_3N_4$ used as a nucleating agent is preferred to be of the $\alpha$-type. However, the $Si_3N_4$ may be formed of the $\beta$-type, or if necessary, contain other elements such as aluminium or oxygen in solid solution. The nucleating agent may be formed of $Si_3N_4$, SiC, or a silicon oxide nitride series compound alone or a mixture thereof, part of which is substituted by metallic silicon. The nucleating agent should preferably be formed of $Si_3N_4$ in particular in order to produce $\alpha$-$Si_3N_4$ of high purity.

A solid component derived from the washing and filtration of the product of hydrolysis, for example, a mixture of $CH_3 SiO_{3/2}$, carbon and $Si_3N_4$ is baked at a temperature of 1300° to 1550° C. in an atmosphere mainly consisting of a nitrogen gas or a gas of a nitrogen compound. The main constituent of said atmosphere includes $N_2$ gas, $NH_3$ gas, a mixture of $N_2$ and $H_2$ gases and a mixture of $N_2$ and any other inert gas. Particularly preferred for the production of high purity $\alpha$-$Si_3N_4$ is an atmosphere which contains $N_2$ or $NH_3$ acting as a main reaction gas.

Where baking is carried out at a lower temperature than 1300° C., then it is difficult to produce the desired powder of $Si_3N_4$. Where baking is carried out at a higher temperature than 1550° C., then SiC is unnecessarily grown. In either case, it is impossible to produce powder of the desired $\alpha$-$Si_3N_4$ which is adapted to be used as a material of a structural member resistant to high temperature and great stress. If the formation of SiC is permissible, baking may be carried out at a higher temperature than 1550° C.

After the above-mentioned baking is carried out at a temperature of 1300° to 1550° C., the final product of $\alpha$-$Si_3N_4$ may be further heat-treated at a temperature of 600° to 800° C. in an oxidizing atmosphere to remove the residual carbon.

Where a mixture of a liquid silane derivative, carbon and powder of a nucleating agent is hydrolyzed to produce a precipitate, then said precipitate is supposedly deposited on the surface of particles of carbon powder. A solid component containing the product of hydrolysis is separated by washing. The separated solid component should preferably be heat-treated at a temperature of 200° to 300° C. for dehydration. The product of hydrolysis, for example, $CH_3SiO_{3/2}$ is adsorbed to the surface of particles of carbon powder over a broad contact area, thereby effecting the smooth reduction of $SiO_2$ by carbon. Since, further, the alkyl group is readily substituted by nitrogen, the aforesaid nitrogenization reaction quickly proceeds. Powder of $\alpha$-$Si_3N_4$ produced by the above-mentioned wet process of the invention contains as small an amount of impurities as less than one-tenth of those contained in the prior art similar product in which $SiO_2$ is used as a starting material. According to the wet process thus explained, since alkylchlorosilane is hydrolized in the presence of carbon powder and silicon compound powder, the hydrolysis of alkylchlorosilane is impeded by carbon powder and silicon compound powder, making it difficult to effect complete hydrolysis. This may lead to an outflow of an effective Si content. For this reason, an inaccurate blend ratio of the material to be baked is involved, producing a low yield and a disadvantageous result from the industrial viewpoint. According to the dry process of this invention, since alkylchlorosilane alone is beforehand hydrolized, complete hydrolysis is effected, permitting accurate selection of the above-mentioned blend ratio and a high yield. The dry process of this invention is substantially similar to the above-mentioned wet process in respect of, for example, a raw material, hydrolizing conditions, conditions of washing and separating the product of hydrolysis, and baking conditions, except that the hydrolizing and mixing processes are reversed in the case of the wet process. In the method of this invention so explained, a solid mixture before baking, for example, a mixture of $CH_3SiO_{3/2}$, C and silicon compound are normally granular mixtures. An amount of carbon can be lowered to 0.1 to 0.3 weight percent by grinding the granular mixture and nitrogenizing the resultant powder. For this reason, the decarbonizing process can be simplified and thus $\alpha$-$Si_3N_4$ can be obtained in high yield. Such an effect may be regarded as being ascribed to the fact that, by crushing the granular mixture, the capability of the oxidation/reduction of $CH_3$ radicals in $CH_3SiO_{3/2}$ is prominently manifested, permitting carerties of the sample products being set forth in Table 1 below.

Note that in controls 1 and 2 a commercially available $SiO_2$ powder was used.

TABLE 1

| Samples | | Reaction conditions | | | | | Properties of produced powder | | | |
|---|---|---|---|---|---|---|---|---|---|---|
| | Proportions of raw materials | | | temperature | Time (hr) | Material of reaction atmosphere | Particle size (microns) | Percentage nitrogen content (%) | Percentage content of α-Si₃N₄ (%) | Percentage content of impurities (%) |
| | SiO₂* | C | Si₃N₄ | | | | | | | |
| Examples 1 | 1 | 0.4 | 0.01 | 1450 | 5 | N₂ | 1.2 | 37.4 | 98 | 0.05 |
| 2 | 1 | " | 0.02 | " | " | " | 1.1 | " | 96 | " |
| 3 | 1 | " | 0.05 | " | " | " | " | 37.5 | 95 | 0.06 |
| 4 | 1 | " | 0.1 | " | " | " | 1.0 | 37.8 | " | 0.05 |
| 5 | 1 | 0.3 | 0.02 | " | " | " | 1.5 | 36.8 | " | " |
| 6 | 1 | 0.6 | 0.01 | " | " | " | 0.9 | 37.5 | 98 | 0.04 |
| 7 | 1 | 1 | " | " | " | " | 0.8 | 37.8 | 98 | 0.06 |
| 8 | 1 | 2 | " | " | " | " | " | 37.5 | 97 | 0.03 |
| 9 | 1 | " | 0.1 | " | " | " | 0.5 | 37.8 | 95 | " |
| 10 | 1 | 1 | 0.01 | 1400 | " | " | 0.8 | 37.9 | 98 | 0.03 |
| 11 | 1 | 0.4 | " | 1500 | 10 | " | 1.3 | 37.8 | 97 | 0.04 |
| 12 | 1 | " | " | 1450 | 5 | N₂ + H₂ | 1.2 | 37.4 | 98 | 0.03 |
| 13 | 1 | 0.2 | 0.1 | 1400 | " | N₂ | 1.2 | 35.7 | 85 | 0.06 |
| Controls 1 | 1 | 4 | 0.1 | " | " | N₂ | 1.1 | 37.5 | 96 | 0.13 |
| 2 | 1 | 0.4 | 0.01 | " | " | " | 2.0 | 32.1 | 95 | 0.09 |
| 3 | 1 | " | 0 | " | " | " | 4.5 | 37.0 | 92 | 0.05 |
| 4 | 1 | 0.05 | 0.1 | " | " | " | 1.5 | 10.5 | 30 | 0.03 |

*Proportions of methyltrichlorosilane used as a starting material as converted to SiO₂ obtained after hydrolysis and baking bon in $CH_3$ radicals to be used as part of the reducing carbon. It is preferable that the granular mixture be crushed to a powder particle size of 50 μm or less.

As described above, the method of this invention can manufacture from inexpensive raw materials powder of α-$Si_3N_4$ of high purity and substantially uniform particle size which has sufficiently excellent properties to be applied as a material of a sintered structural member resistant to high temperature and great stress.

Where in particular to solid mixture is crushed before baking, the yield of α-$Si_3N_4$ can be greatly improved.

This invention will be more fully understood from examples and controls which follow.

EXAMPLE 1

1 part by weight (as converted to $SiO_2$) of methyltrichlorosilane, 0.4 part by weight of powder of carbon having a mean particle size of 0.029 micron and 0.01 part by weight of powder of $Si_3N_4$ having a mean particle size of 0.3 micron were blended together to provide a liquid-solid mixture. A large amount of pure water was added to the mixture. The mass was hydrolyzed with heat generation well controlled, to produce a precipitate. A solid component containing the precipitate was washed with water to thoroughly remove HCl, followed by drying at 110° C. for 3 hours. The dried solid component was roughly crushed in a ball mill. The crushed mass was left 5 hours in streams of $N_2$ gas at 1450° C. for reaction. The reacted mass was heat-treated 3 hours in the air at 700° C. to remove the residual carbon, producing powder of $Si_3N_4$.

The produced powder of $Si_3N_4$ had a high purity. Metal impurities totaled less than 0.05%. The produced powder of $Si_3N_4$ had a mean particle size of 1.2 microns and contained 98% of α-$Si_3N_4$.

EXAMPLES 2 TO 13 AND CONTROLS 1 TO 4

Powder of α-$Si_3N_4$ was produced in substantially the same manner as in Example 1, except that the kinds and proportions of raw materials and the conditions of reaction were changed, the results of determining the prop- As apparent from Table 1 above, the samples of powder of $Si_3N_4$ produced by the method of this invention all contain a smaller amount of impurities than 0.09%, as large an amount of α-$Si_3N_4$ as over 85%, as high a content of nitrogen as 35 to 38%, and as small a particle size as less than 1.5 micron. Therefore, powder of $Si_3N_4$ produced by the method of this invention has been proved suitable to be used as a material of a structural member resistant to high temperature and great stress.

EXAMPLE 14

A greater amount of pure water was added to 1 part by weight (as converted to $SiO_2$) of methyltrichlorosilane with heat generation controlled, to produce a precipitate. After the precipitate was thoroughly washed with water to remove HCl, the precipitate was dried 3 hours at 110° C. to obtain the hydrolysis product of a mean particle size of 0.2 μm. 0.13 part by weight of carbon with a particle size of 0.029 μm and 0.01 part by weight of $Si_3N_4$ with a particle size of 0.3 μm were added to the product of hydrolysis. The resultant mixture was introduced in a polyethylene pot, blended 5 hours in a ball mill made of quartz and left in streams of nitrogen 5 hours at 1450° C. Then, the resultant reaction product was heat-treated in the air 3 hours at 700° C. to obtain $Si_3N_4$ powder. The properties of $Si_3N_4$ powder is shown in Table 2.

EXAMPLES 5 TO 8 AND CONTROLS 5 TO 7

$Si_3N_4$ powder was formed in the same way as in Example 14, except that the kinds and blend ratios of the raw materials, blend conditions and reaction conditions were varied. The properties of the $Si_3N_4$ are shown in Table 2.

As evident from Table 2 it will be appreciated that according to the method of this invention high-purity α-$Si_3N_4$ powder is obtained with above 91% α-$Si_3N_4$ and about 36 to 38% nitrogen content. It will also be appreciated that α-$Si_3N_4$ is obtained in high yield by grinding the granular mixture to a particle size of below 50 μm before a baking process.

precipitate and HCl by hydrolysis which precipitate is convertible to $SiO_2$ at a baking temperature

TABLE 2

| | | Blend conditions | | | | Reactions conditions | | | Properties of produced powder | | | | | |
|---|---|---|---|---|---|---|---|---|---|---|---|---|---|---|
| Samples | | Raw material component ratio | | | hours | Particle size (μm) | temperature (°C.) | hours (hr) | atmosphere | particle size (μm) | percentage nitrogen content (%) | α-$Si_3N_4$ (%) | amount of SiC (%) | amount of impurities (%) | yield* (%) |
| | | $SiO_2$* | C | $Si_3N_4$ | | | | | | | | | | | |
| Examples | 14 | 1 | 0.13 | 0.01 | 5 | 20 | 1450 | 5 | $N_2$ | 1.4 | 37.3 | 98 | 0.30 | 0.04 | 61 |
| | 15 | " | " | 1 | " | " | " | " | " | 1.1 | 37.4 | 91 | 0.30 | 0.04 | 77 |
| | 16 | " | " | 0.005 | " | " | " | " | " | 1.7 | 37.4 | 99 | 0.30 | 0.04 | 77 |
| | 17 | " | 2 | 0.01 | " | " | " | " | " | 1.3 | 37.7 | 98 | 0.28 | 0.14 | 22 |
| | 18 | " | 0.09 | " | " | " | " | " | " | 1.3 | 36.6 | 98 | 0.41 | 0.03 | 63 |
| | 19 | " | 0.13 | " | " | " | 1380 | " | " | 1.4 | 36.1 | 98 | 0.26 | 0.04 | 60 |
| | 20 | " | " | " | " | " | 1500 | 2 | " | 1.5 | 37.9 | 98 | 0.51 | 0.04 | 60 |
| | 21 | " | " | " | " | " | 1450 | 5 | $N_2 + H_2$ | 1.4 | 37.2 | 97 | 0.27 | 0.04 | 60 |
| | 22 | " | " | " | " | " | " | " | $NH_3$ | 1.3 | 38.0 | 98 | 0.28 | 0.04 | 60 |
| | 23 | " | " | " | " | " | " | " | $N_2 + Ar$ | 1.4 | 37.1 | 97 | 0.51 | 0.04 | 60 |
| | 24 | " | 0.2 | " | " | " | " | " | $N_2$ | 1.4 | 37.2 | 98 | 0.31 | 0.04 | 57 |
| | 25 | " | 0.40 | " | " | " | " | " | " | 1.4 | 37.2 | 98 | 0.31 | 0.04 | 50 |
| | 26 | " | 0.13 | " | 0.5 | 50 | " | " | " | 1.4 | 36.0 | 97 | 0.30 | 0.04 | 58 |
| | 27 | " | " | " | 3 | 70 | " | " | " | 1.4 | 35.9 | 92 | 0.30 | 0.04 | 52 |
| | 28 | " | " | " | 10 | 10 | " | " | " | 1.3 | 37.9 | 98 | 0.30 | 0.04 | 60 |
| Controls | 5 | 1 | 0.13 | — | 5 | 20 | 1450 | 5 | $N_2$ | 3.7 | 36.6 | 98 | 0.30 | 0.04 | 60 |
| | 6 | " | 0.05 | 0.01 | " | " | " | " | " | 1.4 | 30.1 | 98 | 0.30 | 0.04 | 64 |
| | 7 | " | 4 | " | " | " | " | " | " | 1.4 | 37.8 | 98 | 0.31 | 0.34 | 12 |

*Proportions of methyltrichlorosilane used as a starting material as converted to $SiO_2$ obtained after hydrolysis and baking
**(amount of α-$Si_3N_4$ powder product/amount of ground powder mixture) × 100

EXAMPLES 29 TO 43

Experiments were conducted, in the same procedure as in Examples 1 to 13, with and without the process of grinding a granular mixture, the results of which are shown in Table 3. As evident from Table 3 it will be appreciated that in Examples 29 to 41 using the grinding process the yields are above 49, while in Examples 42 and 43 using no grinding process the yields are less than 39.

of 1300° to 1550° C.;
hydrolyzing the resultant mixture;
washing the mixture to separate a solid component; and
baking the solid component at a temperature of 1300° to 1550° C. in an atmosphere mainly consisting of a nitrogen gas or a gas of a nitrogen compound to effect formation of α-silicon nitride.

2. A method for producing powder of α-silicon nitride which comprises the steps of:

TABLE 3

| | | Raw material component ratio | | | Crushing time | | Reaction time | | | Properties of produced power | | | | | |
|---|---|---|---|---|---|---|---|---|---|---|---|---|---|---|---|
| Samples | | $SiO_2$* | C | $Si_3N_4$ | time (hr) | particle size (μm) | temperature (°C.) | hours (hr) | atmosphere | particle size (μm) | percentage nitrogen content (%) | amount of α-$Si_3N_4$ (%) | amount of SiC (%) | impurities (%) | yield* (%) |
| Examples | 29 | 1 | 0.2 | 0.1 | 5 | 20 | 1400 | 5 | $N_2$ | 1.2 | 37.8 | 95 | 0.3 | 0.06 | 60 |
| | 30 | 1 | 0.2 | 0.01 | " | " | " | " | " | 1.4 | 36.5 | 95 | 0.3 | 0.06 | 58 |
| | 31 | 1 | 0.2 | 0.005 | " | " | " | " | " | 1.8 | 34.0 | 96 | 0.3 | 0.06 | 56 |
| | 32 | 1 | 0.2 | 1 | " | " | " | " | " | 1.0 | 38.0 | 90 | 0.4 | 0.06 | 75 |
| | 33 | 1 | 0.2 | 0.1 | " | " | 1550 | " | " | 1.1 | 38.6 | 96 | 0.5 | 0.08 | 64 |
| | 34 | 1 | 0.3 | 0.1 | " | " | 1400 | " | " | 1.1 | 36.0 | 95 | 0.2 | 0.06 | 57 |
| | 35 | 1 | 0.1 | 0.1 | " | " | " | " | " | 1.1 | 36.4 | 96 | 0.3 | 0.04 | 66 |
| | 36 | 1 | 0.2 | 0.1 | 3 | 50 | " | " | " | 1.2 | 35.0 | 95 | 0.3 | 0.05 | 58 |
| | 37 | 1 | 0.2 | 0.1 | 5 | 20 | 1380 | " | " | 1.2 | 37.5 | 95 | 0.3 | 0.06 | 60 |
| | 38 | 1 | 0.2 | 0.1 | " | " | 1450 | " | " | 1.2 | 37.9 | 96 | 0.3 | 0.07 | 60 |
| | 39 | 1 | 0.2 | 0.1 | " | " | 1500 | 2 | " | 1.2 | 38.0 | 97 | 0.3 | 0.06 | 60 |
| | 40 | 1 | 0.2 | 0.1 | 10 | 10 | 1400 | 5 | " | 0.9 | 38.4 | 97 | 0.1 | 0.06 | 61 |
| | 41 | 1 | 0.5 | 0.1 | 5 | 20 | 1400 | 5 | $N_2$ | 1.1 | 37.0 | 96 | 0.2 | 0.08 | 49 |
| | 42 | 1 | 2 | 0.1 | 0 | 200 | " | " | " | 1.3 | 36.8 | 95 | 0.3 | 0.13 | 25 |
| | 43 | 1 | 0.3 | 0.1 | 0 | 200 | " | " | " | 0.9 | 35.6 | 93 | 0.2 | 0.10 | 39 |

*Proportions of methyltrichlorosilane used as a starting material as converted to $SiO_2$ obtained after hydrolysis and baking
**(amount of α-$Si_3N_4$ powder product/amount of ground powder mixture) × 100

What we claim is:

1. A method for producing powder of α-silicon nitride which comprises the steps of:
adding 0.1 to 2 parts by weight of carbon and 0.005 to 1 part by weight of at least one silicon compound selected from the group consisting of $Si_3N_4$, SiC and $Si_2ON_2$ to 1 part by weight, when converted to $SiO_2$, of a liquid alkylchlorosilane that forms a hydrolyzing a liquid alkyl-chlorosilane to form a precipitate and HCl, the precipitate being convertible to $SiO_2$ at a baking temperature of 1300° to 1550° C.;
washing the hydrolyzed mass to separate a solid component;
adding 0.1 to 2 parts by weight of carbon and 0.005 to 1 part by weight of at least one silicon compound selected from the group consisting of Si$_3$N$_4$, SiC and Si$_2$ON$_2$ to one part by weight, when converted to SiO$_2$, of said precipitate; and baking the resultant mixture at a temperature of 1300° to 1550° C. in an atmosphere mainly consisting of a nitrogen gas or a gas of a nitrogen compound to effect formation of α-silicon nitride.

3. The method according to claim 1 or 2, further comprising a step of grinding the solid component or resultant mixture prior to baking.

4. The method according to claim 3, wherein the solid component or resultant mixture is ground to a powder particle size of 50 μm or less.

5. The method according to claim 3, wherein the carbon is added in an amount ranging from 0.1 to 0.3 part by weight.

6. The method according to claim 1 or 2, wherein the alkylchlorosilane is methyltrichlorosilane.

7. The method according to claim 1 or 2, wherein the alkylchlorosilane is a mixture of methyltrichlorosilane and dimethyldichlorosilane.

8. The method according to claim 1 or 2, wherein the nitrogen compound gas is NH$_3$.

9. The method according to claim 1 or 2, wherein the solid component is thermally dehydrated at a temperature of 200° to 300° C., before baked at a temperature of 1300° to 1550° C.

10. The method according to claim 1 or 2, wherein the reaction product is baked at a temperature of 1300° to 1550° C. is again baked in an oxidizing atmosphere at a temperature of 600° to 800° C.

11. The method according to claim 1 or 2, wherein the carbon is added in an amount ranging from 0.4 to 1 part by weight.

12. The method according to claim 1 or 2, wherein the silicon compound is added in an amount ranging from 0.01 to 0.1 part by weight.

13. The method according to claim 1 or 2, wherein the carbon has a mean particle size smaller than 1 micron.

14. The method according to claim 1 or 2, wherein the silicon compound has a mean particle size smaller than 2 microns.

* * * * *